(12) United States Patent
Feinleib et al.

(10) Patent No.: US 7,487,249 B2
(45) Date of Patent: *Feb. 3, 2009

(54) SYSTEM AND METHOD FOR UNIFIED REGISTRATION INFORMATION COLLECTION

(75) Inventors: David Feinleib, Kirkland, WA (US); Carl L. Gulledge, Redmond, WA (US); Kenneth D. Moss, Redmond, WA (US); Autumn F.G. Neault, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

This patent is subject to a terminal disclaimer.

(21) Appl. No.: 10/940,377

(22) Filed: Sep. 14, 2004

(65) Prior Publication Data

US 2005/0033729 A1    Feb. 10, 2005

Related U.S. Application Data

(63) Continuation of application No. 09/433,188, filed on Oct. 25, 1999, now Pat. No. 6,874,028.

(51) Int. Cl.
G06F 15/16   (2006.01)

(52) U.S. Cl. .................. 709/227; 709/217; 709/220; 707/1; 707/10; 705/22; 705/23

(58) Field of Classification Search ........... 709/203, 709/206, 217–227, 229; 710/5, 36; 707/1–10; 705/4–27
See application file for complete search history.

(56) References Cited

U.S. PATENT DOCUMENTS

| | | | |
|---|---|---|---|
| 5,761,507 A | 6/1998 | Govett | |
| 5,812,768 A | 9/1998 | Page et al. | |
| 5,905,862 A | 5/1999 | Hoekstra | |
| 6,035,423 A * | 3/2000 | Hodges et al. | 714/38 |
| 6,067,582 A * | 5/2000 | Smith et al. | 710/5 |
| 6,119,157 A | 9/2000 | Traversat et al. | |
| 6,128,644 A | 10/2000 | Nozaki | |
| 6,151,643 A * | 11/2000 | Cheng et al. | 710/36 |
| 6,161,125 A * | 12/2000 | Traversat et al. | 709/203 |
| 6,182,142 B1 | 1/2001 | Win et al. | |
| 6,226,750 B1 | 5/2001 | Trieger | |
| 6,233,565 B1 | 5/2001 | Lewis et al. | |
| 6,273,622 B1 | 8/2001 | Ben-David | |
| 6,282,573 B1 * | 8/2001 | Darago et al. | 709/229 |
| 6,298,341 B1 | 10/2001 | Mann et al. | |
| 6,324,542 B1 | 11/2001 | Wright, Jr. et al. | |
| 6,397,247 B1 | 5/2002 | Shirakawa et al. | |
| 6,421,768 B1 | 7/2002 | Purpura | |
| 6,453,353 B1 | 9/2002 | Win et al. | |
| 6,529,938 B1 | 3/2003 | Cochran et al. | |

(Continued)

Primary Examiner—Thu Ha T Nguyen (57) ABSTRACT

A client computer collects registration information and uploads the collected information to one or more remote registration databases. The collection and/or uploading of registration information for multiple manufacturers is performed in a unified manner, improving the user-friendliness of the computer. According to one aspect of the invention, a single user interface is used to collect the registration information for all of the manufacturers, preventing the same question from being asked multiple times. According to another aspect of the invention, a multiple posting method is used to upload the registration information to the registration databases. In the multiple posting method, a single network communication link is established between the client computer and a network that the registration databases are coupled to, via which multiple client computer to registration database connections are established.

28 Claims, 4 Drawing Sheets

U.S. PATENT DOCUMENTS

| | | |
|---|---|---|
| 6,629,134 B2 | 9/2003 | Hayward et al. |
| 6,751,794 B1 | 6/2004 | McCaleb et al. |
| 6,961,712 B1 * | 11/2005 | Perkowski .................... 705/27 |
| 7,069,241 B1 * | 6/2006 | Usui ............................ 705/35 |
| 2001/0016877 A1 * | 8/2001 | Dancs et al. ................ 709/227 |
| 2002/0010785 A1 * | 1/2002 | Katsukawa et al. ......... 709/229 |
| 2002/0023123 A1 * | 2/2002 | Madison ..................... 709/203 |
| 2002/0112052 A1 | 8/2002 | Brittingham et al. |
| 2002/0169961 A1 | 11/2002 | Giles et al. |
| 2005/0044198 A1 * | 2/2005 | Okitsu et al. ................ 709/223 |
| 2005/0114456 A1 * | 5/2005 | Mathew et al. .............. 709/206 |
| 2005/0193122 A1 * | 9/2005 | Feinleib et al. ............. 709/227 |

* cited by examiner

SYSTEM AND METHOD FOR UNIFIED REGISTRATION INFORMATION COLLECTION

RELATED APPLICATIONS

This is a continuation of U.S. patent application Ser. No. 09/433,188, filed on Oct. 25, 1999, entitled "System and Method for Unified Registration Information Collection", listing David Feinleib, Carl Gulledge, Ken Moss and Autumn Neault as inventors, the disclosure of which is hereby incorporated by reference.

TECHNICAL FIELD

This invention relates to computer systems and collection of information regarding computer system users. More particularly, the invention relates to unified collection and uploading of user registration information.

BACKGROUND OF THE INVENTION

Uses for computers in our daily lives are continually expanding. As these uses expand, it is beneficial for the manufacturers of both the computers and the software the computers run to have information on the manner in which the computers and software are used, as well as information on the users of the computers and software. Having such information assists the manufacturers in designing and creating computers and software that are more useful and better aligned with users' needs and desires. Providing such information to the manufacturers is also beneficial to users on a daily basis because the manufacturer can personalize the user's computer/software experience by establishing an ongoing electronic relationship with the consumer.

One approach to obtaining such information is to collect "registration information" or "registration data" from the user and transmit it to the manufacturer. Registration information refers to demographic and other information regarding the user and the user's computer. This might include information such as the user's intended use of the computer or software, the user's preferred activities, hobbies, other computer hardware or software components or peripherals that are being used in conjunction with the computer or software, the user's electronic mail or street address, locale information (e.g., zip code), etc. The registration information may also include information regarding the computer itself (e.g., identification numbers, processor type, amount of memory, installed ompo-nents, etc.).

Registration information is typically collected via multiple "registration wizards", each of which is a program that is executed when the computer is initially set up by the user or the software is installed. Each registration wizard asks the user various questions to elicit the registration information, and may also interrogate the computer itself to obtain information (e.g., processor type) regarding the computer. Once the registration information is collected, the registration wizard transmits or "uploads" the collected information to a registration database, from which a manufacturer is able to subsequently retrieve the collected information. The registration database is typically accessed via a direct-connection (e.g., a direct phone call to a computer system maintaining the registration database) or via a network (e.g., the Internet, which may also require a modem call to access the network).

There are typically different registration wizards for the computer, one or more of the software programs being run on the computer, and sometimes for additional peripheral devices coupled to the computer (e.g., printers or scanners). However, much of the information that the different manufacturers want to obtain is often the same (e.g., name, address, phone number, etc.). Requiring users to repeatedly answer the same questions over and over results in a time-consuming, "unfriendly" user experience. Thus, it would be beneficial to provide a more user-friendly way to collect registration information.

Additionally, once the registration information is collected the user's computer typically makes multiple modem calls to upload the registration information. One modem call (whether the connection be direct or via a network) is typically made to each of the registration databases. Making such multiple modem calls is a further time-consuming process and, due to the time involved, can result in a further "unfriendly" user experience. One solution to this problem is for the computer to make a single modem call to the computer manufacturer or a designated third party, which receives all of the registration information, and then transfers the appropriate parts of the registration information to all parties interested in the data. However, this can be problematic because the manufacturer or third party may not want to receive all of the information, or there may be disagreements between the manufacturers regarding which of them pays for the modem call from the computer to the specified manufacturer.

The invention described below addresses these disadvantages of the prior art, providing an improved way to collect and upload user registration information.

SUMMARY OF THE INVENTION

A client computer collects registration information and uploads the collected information to one or more remote registration databases. The collection and/or uploading of registration information for multiple manufacturers is performed in a unified manner, improving the user-friendliness of the computer.

According to one aspect of the invention, a single user interface is used to collect the registration information for all of the manufacturers. By using a single user interface, a user is not presented with the same question by each of the multiple manufacturers. Rather, asking of common questions (e.g., the user's name) is performed once and the collected response information is then provided to each of the multiple manufacturers.

According to another aspect of the invention, a multiple posting method is used to upload the registration information to more than one registration database. In the multiple posting method, a single network communication link (e.g., via a single modem call) is established between the client computer and a network that the registration databases are coupled to. Once the communication link is established, additional client computer to registration database connections are established via the communication link, allowing the registration information to be uploaded to multiple registration databases via the single communication link.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Architecture

Figure 1:
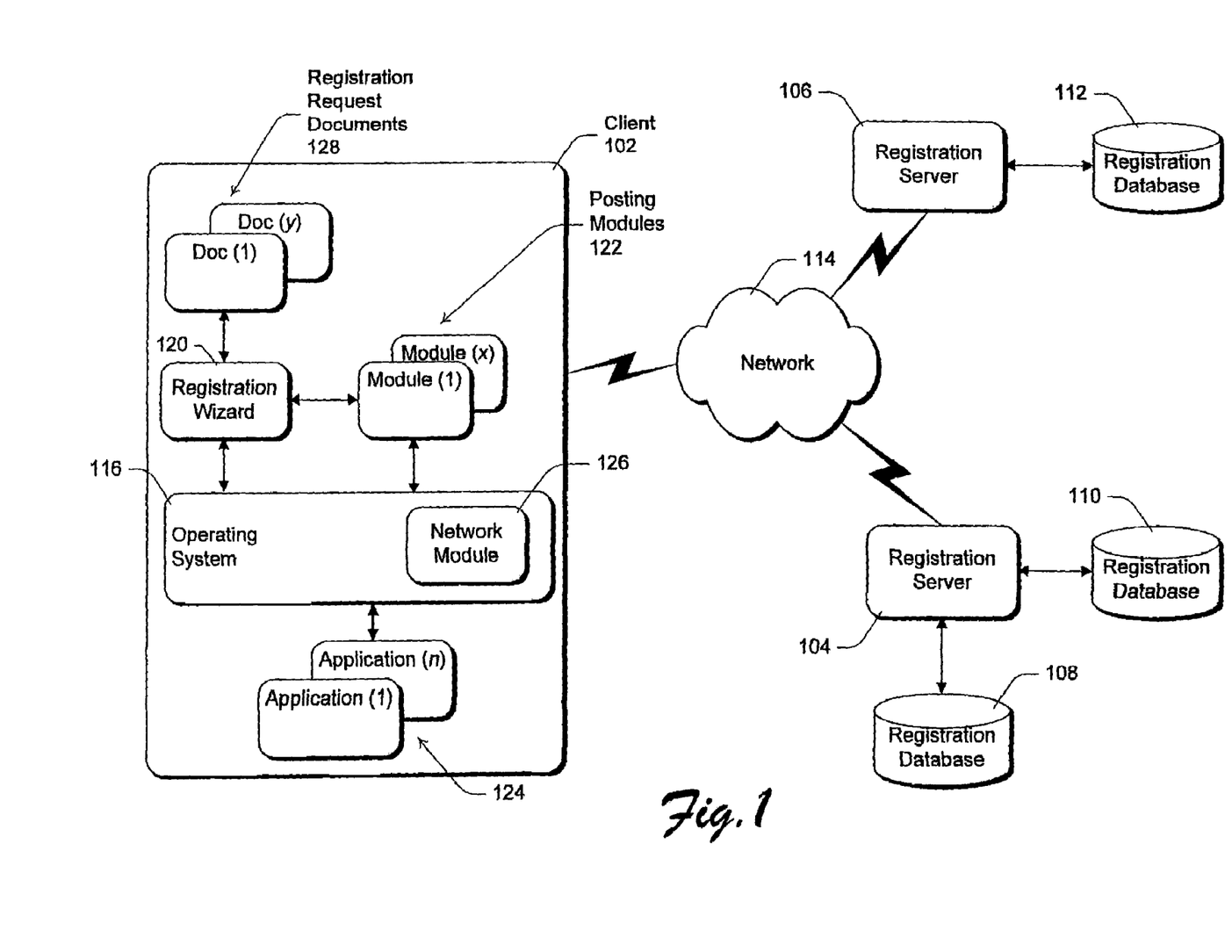
FIG. 1 illustrates an exemplary client computer and multiple remote registration servers in accordance with the invention.

FIG. 1 illustrates an exemplary client computer 102 and multiple remote registration servers 104 and 106 in accordance with the invention. Registration data or information is collected at client computer 102 and subsequently transferred (also referred to as "uploaded" or "posted") to registration server 104 and/or 106, where the registration information is stored in one of registration databases 108, 110, or 112.

Client computer 102 communicates with servers 104 and 106 via a data communications network 114. In the illustrated example, data communications network 114 can include one or more of: the Internet, a public switched telephone network (PSTN), local area networks (LANs), and private wide area networks (WANs). Communication between client 102 and registration servers 104 and 106 can be via any of a variety of conventional communication protocols, such as the Hypertext Transfer Protocol (HTTP).

Registration server 104 is coupled to registration databases 108 and 110, while registration server 106 is coupled to registration database 112. Although illustrated separately, it is to be appreciated that registration databases 108 and/or 110 may alternatively be part of server computer 104, and registration database 112 may alternatively be part of server computer 106. Servers 104 and 106 may have additional conventional "web server" functionality, or alternatively may be dedicated servers used only for receiving registration information only.

Client computer 102 includes an operating system 116, registration wizard 120, posting modules 122, and multiple (n) additional applications 124. Operating system 114 represents any of a wide variety of conventional operating systems, such as the "Windows" brand of operating systems, available from Microsoft Corporation of Redmond, Wash. Registration wizard 120 and posting modules 122 are illustrated as separate from operating system 116. Alternatively, one or more of wizard 120 and modules 122 may be incorporated into operating system 114. Additional software applications 124 may also be running on client 102. Examples of such applications include games, word processors, spreadsheets, etc.

Operating system 116 includes a network module 126 that controls the access of client computer 102 to network 114. Network module 126 can establish, at the request of an application running on client computer 102, a communication link to network 114. Such a communication link can be established in any of a variety of conventional manners, such as a "dial-up connection" using a conventional modem and telephone line, through a network proxy, etc. Once established, network module 126 manages the communication link according to any of a wide variety of conventional communications protocols, allowing different applications running on client 102 to communicate with servers 104 and 106, as well as any other devices or computers coupled to network 114.

Registration wizard 120 collects registration information, including demographic and/or other user-or client computer-related information from a user of client 102. This collection occurs, for example, when the client computer is first set up or the software is first installed. Registration wizard 120 collects this registration information by prompting the user for inputs via a user interface (UI). This prompting can be done in any of a variety of conventional manners, such as through menu options, radio buttons, or other data-entry fields of a graphical user interface, through audio questions and user-responses via a microphone, etc. Registration wizard 120 may also interrogate, either with or without the user's knowledge, the operating system 116 or other modules to ascertain additional computer-related information (e.g., processor type, amount of memory, etc.).

Typically, both the manufacturer of client computer 102 and the manufacturer of operating system 116 want to collect registration information. Furthermore, manufacturers of other applications 124 as well as other peripheral components (not shown), such as printers or scanners, may also want to collect registration information. As used herein, each of the different components (whether hardware or software) of client computer 102 (including client computer 102 itself) for which registration information is to be collected is referred to as a "registering component".

Registration databases 108-112 correspond to one or more manufacturers. For example, registration database 108 may correspond to the manufacturer of the client computer 102, while registration database 110 and/or registration database 112 may correspond to the manufacturer of the operating system 116. One of the posting modules 122 uploads a portion of the registration information corresponding to the registration requests of a manufacturer to the registration database 108-112 that corresponds to that manufacturer. The registration databases 108-112 can be maintained by the manufacturers, or alternatively by a third party that temporarily stores the registration information until subsequently retrieved by the manufacturer.

According to one aspect of the invention, registration wizard 120 is programmed with the registration requests (e.g., user questions, operating system interrogation requests, etc.) of both the manufacturer of client computer 102 and the manufacturer of operating system 116. By programming registration wizard 120 to collect registration information for both manufacturers, duplicate questions can be eliminated. For example, registration wizard 120 need only request a user's name and address once even though that information may be subsequently provided to both manufacturers.

Alternatively, multiple registration wizards could be used to provide a unified interface that did not duplicate questions for the user. For example, a first registration wizard could be programmed to collect part (e.g., half) of the registration information, while a second registration wizard could be programmed to collect the remaining part (e.g., the other half) of the registration information. Both wizards could have a similar look and feel so that they would appear integrated to the user even though they are two separate programs.

Registration wizard 120 can be programmed with the registration requests in any of a wide variety of conventional manners. According to one implementation, the manufacturer of registration wizard 120 manually adds all of the registration requests to registration wizard 120. Any duplicate questions are removed as part of this manual programming process.

According to another implementation, registration wizard 120 accesses one or more registration request documents 128 to identify which registration information to collect. A "core document" including a core set of registration requests is included in documents 128. The core document is provided by the manufacturer of registration wizard 120 (or alternatively one of the registering components) and includes common information generally requested, such as user name, address, phone number, etc. Any information that the manufacturer wants to collect that is not already collected as part of the core set of registration requests can be collected by adding to the core document. Alternatively, additional documents could be added in addition to the document including the core set of registration requests. During operation, registration wizard 120 accesses documents 128 to determine which information to collect. The manufacturer should take care to ensure that any registration request that it adds is not already in the core set of registration request and has not already been added by another manufacturer.

In the illustrated example, each of the registration request documents 128 is a Hypertext Markup Language (HTML) document that identifies the registration requests to registration wizard 120. During operation, registration wizard 120 collects the registration information identified by the requests in documents 128. Alternatively, other protocols rather than HTML can be used to create documents 128.

Once all of the registration information is collected, registration wizard 120 uploads the registration information to registration databases 108-112 via servers 104 and 106. The registration information can be uploaded to the registration databases via a "single post", "multiple post", or a "serial post" method. Using the single post method, individual client to server connections are made (e.g., modem dial-up connections). Using the multiple post method, a single network communication link is made and, using that communication link, multiple client to server connections are made. Thus, in the multiple post method only a single communication link (e.g., a single modem dial-up connection) need be established. Using the serial post method, a single network communication link is made and, using that communication link, one or more client to server connections are made. A further connection is made originating from the server to another server.

The registration information uploaded to each of the registration servers is dependent on the registration requests provided by each of the manufacturers or third party. The portion of the collected registration information that corresponds to the registration requests provided by a manufacturer is uploaded to the registration server corresponding to that manufacturer or third party. The portions of the registration information uploaded for different manufacturers or third party may "overlap" or share some common information (e.g., both may include the user's name and address), or alternatively the portions may be identical.

Using the single post method, a separate modem call is made to upload or "post" the registration information for each of the manufacturers. Upon collecting the registration information, registration wizard 120 initiates execution of a different posting module 122 for each of the manufacturers. In response, each of the posting modules 122 establishes a communication link (e.g., a dial-up connection) to connect to a predetermined registration server 104 or 106 by invoking network module 126. Upon establishing the connection, the posting module 122 posts the registration information for that manufacturer to the registration database via the corresponding registration server (e.g., to registration database 112 via registration server 106).

Upon completing the posting, posting module 122 terminates, at which point registration wizard 120 calls another of the posting modules 122. The newly called posting module 122 then establishes a communication link to connect to the appropriate one of the registration servers by invoking network module 126. The posting module then proceeds to post the registration information for the corresponding manufacturer to the appropriate one of the registration databases via a corresponding registration server. This process continues until the registration information is posted to each of the appropriate servers.

In the illustrated example of FIG. 1, the posting modules 122 correspond on a one-to-one basis with the registration databases 108-112. The posting modules 122 are manufacturer-specific, as are the registration databases 108-112. Alternatively, multiple posting modules may be combined into a single posting module, or multiple registration databases may correspond to a particular manufacturer and a particular one of modules 122.

Using the multiple post method, a single modem call is made to upload or post the registration information for multiple manufacturers. Upon collecting the registration information, registration wizard 120 establishes a communication link by invoking network module 126. Once the communication link is established, registration wizard 120 calls a first of the posting modules 122. In response, the called posting module 122 establishes a connection (e.g., using HTTP) via the network 114 to the appropriate one of servers 104 and 106. The registration information is uploaded and stored, by the server, in a registration database coupled to the server (e.g., registration database 110 coupled to server 104). The module 122 also provides an identifier of the manufacturer of server 104, which is used by server 104 to determine which of databases 108 or 110 the registration information is to be stored in. After uploading or posting of the registration information is complete, the posting module 122 terminates and registration wizard 120 calls another of the posting modules 122. The newly called posting module 122 establishes an HTTP connection, via the network 114, to the appropriate one of servers 104 and 106 and uploads the registration information for the corresponding manufacturer to the server. This process continues until the registration information is posted to each of the appropriate servers, at which point registration wizard 120 terminates execution and the communication link to network 114 is closed.

Using the serial post method, a single modem call is made to upload or post the registration information for multiple manufacturers or third parties. Upon collecting the registration information, registration wizard 120 establishes a communication link by invoking network module 126. Once the communication link is established, registration wizard 120 calls a first of the posting modules 122. In response, the called posting module 122 establishes a connection (e.g., using HTTP) via the network 114 to the appropriate one of servers 104 and 106; The registration information is uploaded and stored, by the server, in a registration database coupled to the server (e.g., registration database 110 coupled to server 104). The module 122 also provides an identifier of the manufacturer of server 104, which is used by server 104 to determine which of databases 108 or 110 the registration information is to be stored in. After uploading or posting of the registration information is complete, the posting module 122 terminates and registration server 104 or 106 posts to another registration server 104 or 106 (additionally, registration wizard 120 may call one or more additional posting modules 122 to upload registration information to other servers 104 or 106 prior to terminating the communication link). The server 104 or 106 establishes an HTTP connection, via the network 114, to the appropriate one of servers 104 and 106 and uploads the registration information for the corresponding manufacturer or third party to that server. This process continues until the registration information is posted to each of the appropriate servers, at which point registration server 104 or 106 terminates its registering and the communication link between the server 104 or 106 and network 114 is closed. Thus, using the serial post method, some of the registration information is transferred from server to server rather than directly from client to multiple servers.

Alternatively, a posting module 122 may establish a connection to a particular registration database of a server, such as registration database 110. This connection comprises, for example, an HTTP connection between client 102 and server 104 with an identifier of registration database 110 being provided to server 104 by client 102.

Additionally, a single client to server connection may be made that allows uploading of the registration information for multiple manufacturers. In the illustrated example, server 104 is coupled to registration databases 108 and 110. According to one implementation, registration database 108 stores the uploaded registration information corresponding to one of the manufacturers while registration database 110 stores the uploaded registration information corresponding to another of the manufacturers. Therefore, a single modem call and single client to server connection can be used to upload registration information for multiple manufacturers.

Thus, using either the multiple or serial post methods only one modem call need be made in order to establish a communication link to network 114. In the multiple post method, once that communication link is established any number of additional client to server (or client to registration database) connections can be established via the network 114 without having to make another modem call. These client to server connections can be made using any of a variety of different communication protocols, such as HTTP, secure HTTP (HTTPS), etc. In the serial post method, once the communication link to network 114 is established and the registration information is uploaded to a first server, any number of additional servers can receive the registration information (or portions thereof) from the first server (or another server that received the registration information, either directly or indirectly, from the first server). This communication between servers can be made using any of a variety of different communication protocols, such as HTTP or HTTPS.

It should also be noted that, although described above with reference to the unified interface provided by registration wizard 120, the multiple and serial post methods can also be used when there are multiple registration wizards 120. In such situations, network module 126 maintains the network communication link while different registration wizards 120 are executing and calling different posting modules 122. By maintaining the network communication link, uploading of portions of the registration information collected by different registration wizards 120 can be performed even though only one modem call is used to establish the communication link.

The single post, multiple post, and serial post methods are described with reference to establishing a network communication link via a modem call. Alternatively, other conventional connection methodologies may be used with the invention rather than modem calls, such as a network communication link through a proxy server.

Exemplary Computer System

In the discussion herein, the invention is described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Figure 2:
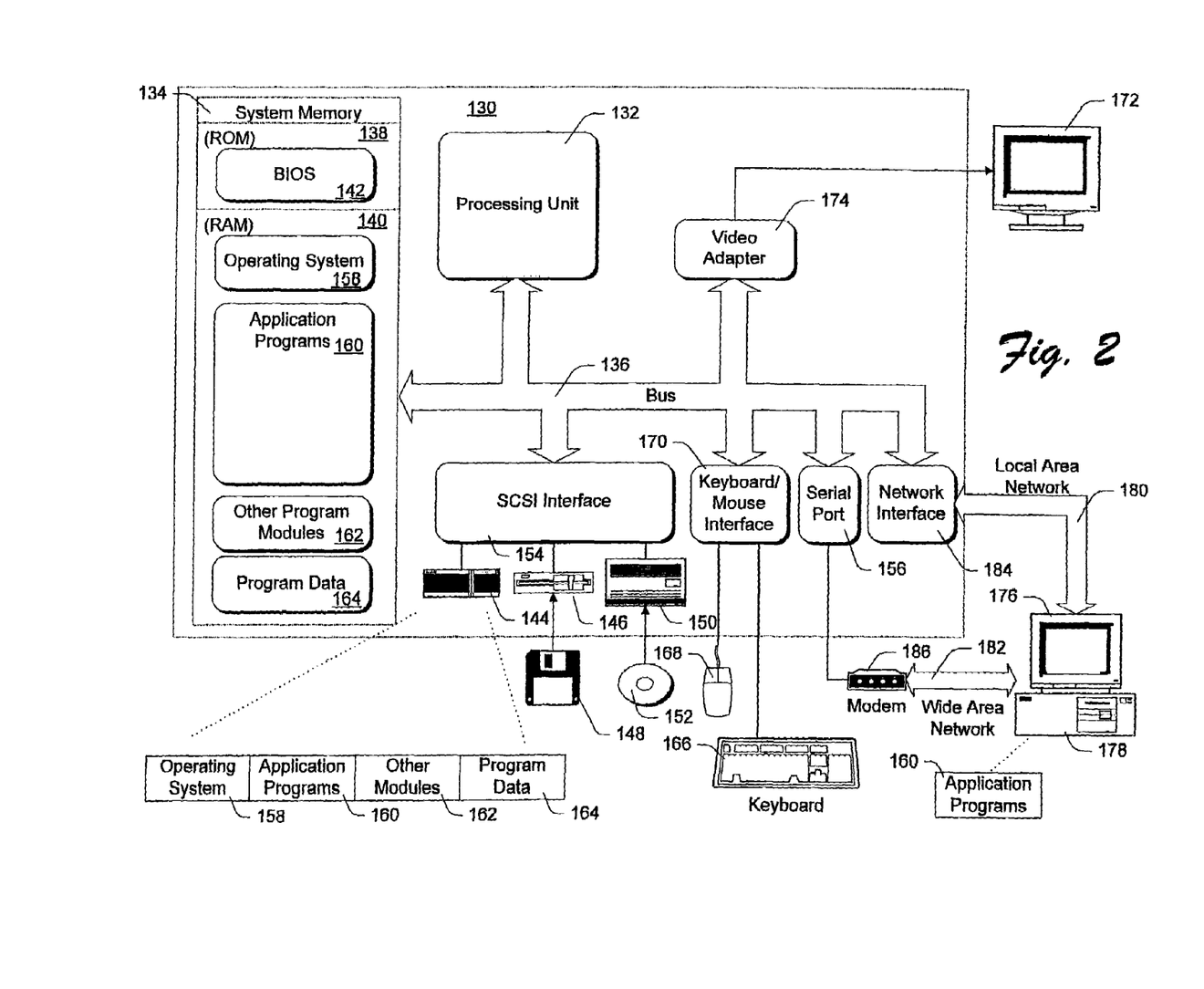
FIG. 2 shows a general example of a computer that can be used as a server or client in accordance with the invention.

FIG. 2 shows a general example of a computer 130 that can be used as a server or client in accordance with the invention. Computer 130 is shown as an example of a computer that can perform the functions of a client computer 102 or a server 104 or 106 of FIG. 1.

Computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer readable instructions, data structures, program modules and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 148, optical disk 152, ROM 138, or RAM 140, including an operating system 158, one or more application programs 160, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet. In the described embodiment of the invention, remote computer 176 executes an Internet Web browser program such as the "Internet Explorer" Web browser manufactured and distributed by Microsoft Corporation of Redmond, Wash.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Operation

Figure 3:
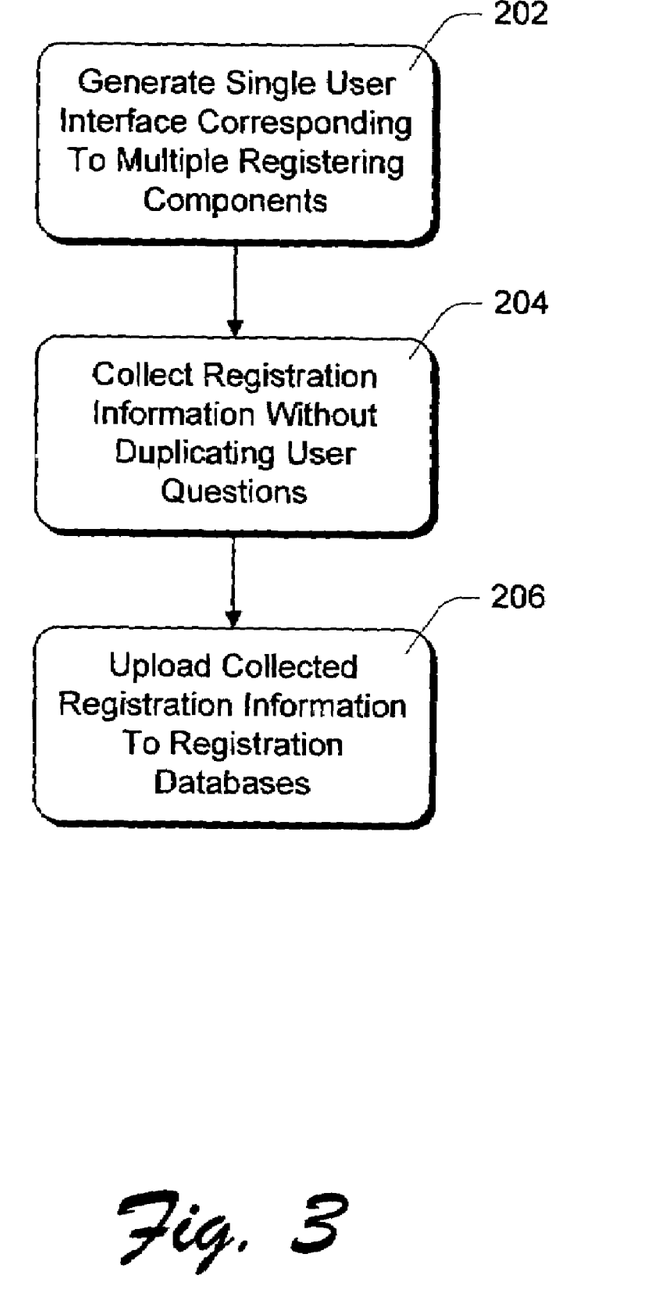
FIG. 3 is a flowchart illustrating an exemplary process for the unified collection of registration information in accordance with one implementation of the invention.

FIG. 3 is a flowchart illustrating an exemplary process for the unified collection of registration information in accordance with one implementation of the invention. The process of FIG. 3 is implemented by client computer 102 of FIG. 1, and may be performed in software. FIG. 3 is described with additional reference to components in FIG. 1.

Registration wizard 120 generates a single user interface corresponding to multiple registering components (step 202). Registration wizard 120 then collects registration information without duplicating questions to the user (step 204). It should be noted that duplicate queries to interrogate the operating system may optionally be avoided in step 204 as well. The collected registration information is then uploaded to the appropriate registration databases (step 206). The uploading of the registration information can be accomplished using the single post, multiple post, or serial post methods discussed above.

Figure 4:
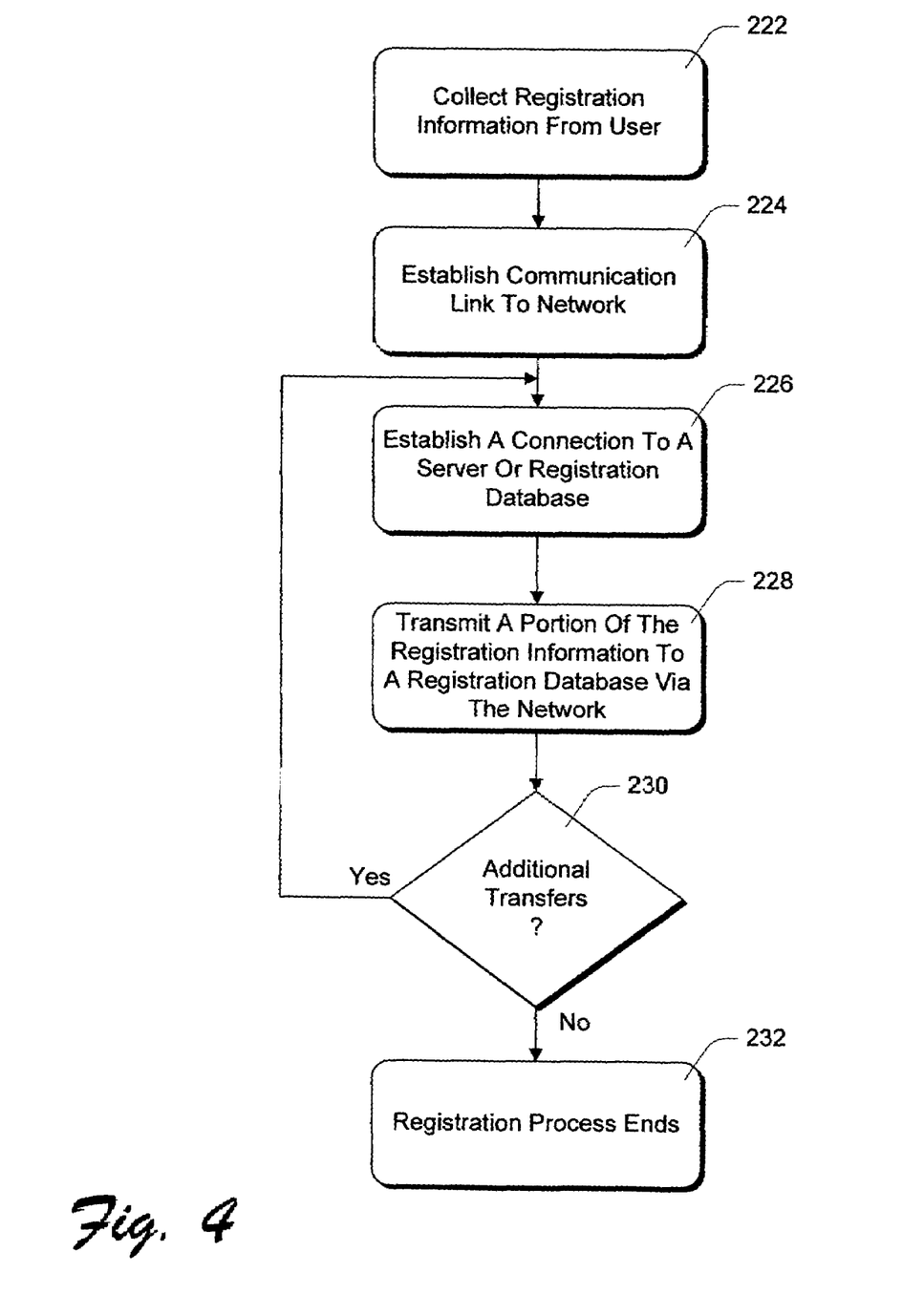
FIG. 4 is a flowchart illustrating an exemplary process for posting of collected registration information in accordance with one implementation of the invention.

FIG. 4 is a flowchart illustrating an exemplary process for posting of collected registration information in accordance with one implementation of the invention. The process of FIG. 4 is implemented by client computer 102 of FIG. 1, and may be performed in software. FIG. 4 is described with additional reference to components in FIG. 1.

The registration information is initially collected by registration wizard 120 (step 222). Network module 126 then establishes a network communication link to the network 114 (step 224). Once the communication link is established, registration wizard 120 invokes one of the posting modules 122, which in turn establishes a connection to one of the servers or databases via the communication link (step 226). The posting module 122 then transfers a portion of the registration information to the server or registration database via the connection (step 228). Registration wizard 120 then checks whether there are additional transfers to be made (step 230). Registration wizard 120 continues to invoke posting modules 122 so long as there are additional transfers to be made (steps 228 and 230). When the appropriate registration information for each of the manufacturers has been transferred to a corresponding server or registration database, the registration process ends (step 230).

CONCLUSION

The invention provides for the unified collection and uploading of user registration information. According to one aspect of the invention, a single user interface is provided to collect the registration information for multiple different manufacturers or third parties. The user is provided with a unified interface that advantageously avoids asking the user duplicate questions. Additionally, according to one aspect of the invention, a multiple post method is used to upload the registration information to the manufacturers' registration databases. The multiple post method advantageously uses a single communication link to the network to upload the registration information to all of the registration databases, regardless of the number of registration databases.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having stored thereon a computer program that, when executed by one or more processors, causes the one or more processors to perform functions including:
    collecting, at a client computer, registration information for a plurality of components of the client computer using one or more registration wizards on behalf of one or more manufacturers;
    establishing a communication link between the client computer and a network;
    establishing multiple connections, via the communication link, to respective multiple registration servers of a plurality of registration servers;
    communicating at least a first portion of the registration information to at least a first registration server of the plurality of registration servers to register a first one of the plurality of components; and communicating at least a second portion of the registration information to a second registration server of the plurality of registration servers to register a second one of the plurality of components.

2. One or more computer-readable media as recited in claim 1, wherein the program further causes the one or more processors to perform functions including:
   establishing additional connections to additional respective registration servers of the plurality of registration servers via the communication link; and
   communicating additional portions of the registration information to the additional registration servers.

3. One or more computer-readable media as recited in claim 1, wherein the first portion and the second portion share at least some common information.

4. One or more computer-readable media as recited in claim 1, wherein the first portion and the second portion are identical.

5. One or more computer-readable media as recited in claim 1, wherein the registration information includes one or more of user demographic information and client computer information.

6. One or more computer-readable media as recited in claim 1, wherein the one or more registration wizards correspond to one or more software applications or hardware components.

7. One or more computer-readable media as recited in claim 1, wherein the establishing the multiple connections comprises establishing a first hypertext transfer protocol (HTTP) connection, and a second hypertext transfer protocol (HTTP) connection.

8. One or more computer-readable memories containing a computer program that is executable by one or more processors to perform acts of:
   collecting, at a client computer, registration information for a plurality of components of the client computer using a registration wizard to enable registering of the plurality of components with respective manufacturers;
   establishing a plurality of connections, via a communication link, between the client computer and a plurality of registration databases; and
   communicating, for each of the plurality of connections, at least a portion of the registration information to one of the plurality of registration databases to register a corresponding one of the plurality of components.

9. One or more computer-readable memories as recited in claim 8, wherein the communicating comprises communicating, for each of the plurality of connections, a different portion of the registration information to the one of the plurality of registration databases.

10. One or more computer-readable memories as recited in claim 9, wherein the different portions share at least some common information.

11. One or more computer-readable memories as recited in claim 8, wherein the registration information includes one or more of user demographic information and client computer information.

12. One or more computer-readable memories as recited in claim 8, wherein collecting comprises collecting the registration information for a plurality of software applications and hardware components.

13. One or more computer-readable media containing a computer program that is executable by one or more processors to perform acts of:
   obtaining registration information collected for a plurality of components of a client computer using a single registration wizard;
   establishing a plurality of connections between the client computer and a plurality of registration databases corresponding to the plurality of registering components; and
   transferring at least a portion of the registration information collected for the plurality of registering components via the single registration wizard to each of the plurality of registration databases via the plurality of connections to register the plurality of registering components.

14. One or more computer-readable media as recited in claim 13, wherein the plurality of registering components includes at least a software component and a hardware component.

15. One or more computer-readable media as recited in claim 14, wherein the hardware component comprises the client computer.

16. One or more computer-readable media as recited in claim 13, wherein the plurality of registering components correspond on a one to one basis with the plurality of registration databases.

17. One or more computer-readable media as recited in claim 13, wherein establishing a plurality of connections comprises:
   establishing a communication link between the client computer and a network; and
   subsequently establishing connections between the client computer and each of the plurality of registration databases via the communication link.

18. One or more computer-readable media as recited in claim 13, wherein establishing a plurality of connections comprises:
   establishing, using a first dial-up number, a first communication link to a first of the plurality of registration databases; and
   upon terminating the first communication link, establishing, using a second dial-up number, a second communication link to a second of the plurality of registration databases.

19. One or more computer-readable media as recited in claim 13, wherein transferring comprises transferring different portions of the registration information to different ones of the plurality of registration databases.

20. One or more computer-readable media as recited in claim 13, wherein the registration information includes one or more of user demographic information and client computer information.

21. A system comprising:
   a processor;
   one or more posting modules, coupled to a registration wizard configured to collect registration information corresponding to a plurality of components of a client computer on behalf of a plurality of manufacturers;
   the one or more posting modules being executable via the processor to:
   establish a plurality of connections between the client computer and a plurality of registration databases corresponding to the plurality of manufacturers, and
   transfer at least a portion of the registration information to each of the plurality of registration databases via the plurality of connections to register each of the plurality of components with a respective one of the plurality of manufacturers.

22. A system as recited in claim 21, wherein the registration information includes one or more of user demographic information and client computer information.

23. A system as recited in claim 21, wherein the plurality of manufacturers include one or more of software application designers, hardware component manufacturers, and the system manufacturer.

24. A system as recited in claim 21, wherein the plurality of manufacturers correspond on a one to one basis with the plurality of registration databases.

25. A system as recited in claim 21, wherein the one or more posting modules are further to transfer different portions of the registration information to different ones of the plurality of registration databases.

26. An apparatus comprising:
   a bus;
   a processor coupled to the bus;
   a network connection device coupled to the bus; and
   a memory, coupled to the bus, to store a plurality of instructions that are executed by the processor, wherein the plurality of instructions, when executed, cause the processor to,
   initiate, using the network connection device, a communication link to a network,
   establish, via the communication link, a plurality of connections between the apparatus and a plurality of registration databases, each registration database corresponding to one or more of a plurality of registering components of the apparatus, and
   communicate, for each of the plurality of connections, at least a portion of previously-collected registration information for at least one of said plurality of registering components to a corresponding one of the plurality of registration databases to register the at least one of said plurality of registering components with a corresponding manufacturer.

27. An apparatus as recited in claim 26, wherein the portion of previously-collected registration information includes one or more of user demographic information and client computer information.

28. One or more computer-readable memories containing a computer program that is executable by one or more processors to perform acts of:
   establishing a plurality of connections between a client computer and a plurality of registration databases corresponding to a plurality of registering components of the client computer; and
   transferring at least a portion of registration information collected at the client computer via a single registration wizard to each of the plurality of registration databases via the plurality of connections to register a corresponding one of the plurality of registering components on behalf of a corresponding manufacturer, wherein establishing a plurality of connections comprises:
   establishing, using a first dial-up number, a first communication link to a first of the plurality of registration databases; and
   upon terminating the first communication link, establishing, using a second dial-up number, a second communication link to a second of the plurality of registration databases.

* * * * *